United States Patent [19]

Wang et al.

[11] Patent Number: 5,498,947

[45] Date of Patent: Mar. 12, 1996

[54] FREQUENCY AND AMPLITUDE VARIABLE WAVEFORM SYNTHESIZER

[75] Inventors: John Z. Wang, Stockton; Timothy S. T. Lee, Santa Cruz; Bairu L. Wong, Stockton, all of Calif.

[73] Assignee: FORTIS CO., Stockton, Calif.

[21] Appl. No.: 239,402

[22] Filed: May 5, 1994

[51] Int. Cl.$^6$ ............................................. H02D 05/28
[52] U.S. Cl. .............................. 318/811; 363/41; 318/807
[58] Field of Search .................................... 318/811, 807, 318/798, 803, 801, 599; 363/98, 41, 51, 95, 96, 58, 43, 132; 364/550, 721, 150, 185, DIG. 1

[56] References Cited

U.S. PATENT DOCUMENTS

| | | | |
|---|---|---|---|
| 4,633,382 | 12/1986 | Upadhyay et al. | 363/132 |
| 4,656,572 | 4/1987 | Caputo et al. | 363/41 |
| 4,686,480 | 8/1987 | Katto et al. | 364/721 |
| 4,807,103 | 2/1989 | Uesugi | 318/811 |
| 4,958,269 | 9/1990 | Gritter | 364/153 |
| 4,994,956 | 2/1991 | Kirchberg, Jr. et al. | 363/98 |
| 5,072,354 | 12/1991 | Katto et al. | 363/98 |
| 5,103,148 | 4/1992 | Berringer et al. | 318/432 |
| 5,175,858 | 12/1992 | Hammerstrom | 395/800 |
| 5,184,310 | 2/1993 | Takenouchi | 364/550 |
| 5,272,424 | 12/1993 | Lee | 318/254 |

OTHER PUBLICATIONS

Jeff Baum and Ken Berringer, "The right µP simplifies using induction motors to propel electric cars", *EDN*, Mar. 31, 1994, pp. 48–54.

*Primary Examiner*—John W. Cabeca
*Attorney, Agent, or Firm*—Samson Yu

[57] ABSTRACT

A waveform synthesizer includes a data memory, an address manager, an interface and a pulse generator. The data memory has a pulse-width value storage for storing values obtained from sampling a low frequency periodic waveform at a high sampling rate. These values stored in the storage can be scaled in response to a requested magnitude by a scaler within the data memory, thereby generating a look-up table with a series of addresses. The address manager includes an address generator and an address incrementer. The address generator generates address codes for accessing the look-up table through the series of addresses. The address incrementer then adjusts the magnitude of the address increments in response to requested frequency input from the interface. The address increments are proportional to the frequency so that when the requested frequency is high, the address increments are large and more addresses are skipped over between retrieve operations. The pulse generator is provided to convert the retrieved values into pulse trains. The typical application of the waveform synthesizer is to drive an AC motor.

4 Claims, 7 Drawing Sheets

FREQUENCY AND AMPLITUDE VARIABLE WAVEFORM SYNTHESIZER

BACKGROUND OF THE INVENTION

The present invention relates to waveform synthesis and, more particularly, to a synthesis of waveforms consisting of a series of pulse-width modulated (PWM) pulses. A major objective of the present invention is to provide for more cost-effective control of alternative-current (inductive) motors.

Practical electric vehicles (EVs) are strongly desired as an alternative to vehicles powered by fossil fuels to reduce pollution and dependence on energy sources. Direct-current (DC) motors have the advantage of straight forward speed control, but have a relatively low power/mass ratio. Alternating-current (AC) motors have a better power/mass ratio, with 1000 horsepower motors being readily available. Currently, the most promising approach to powering an EV appears to be a high-speed AC inductive motor and a 3-phase IGBT (insulated-gate bipolar transistor) inverter. However, precise speed control of such a motor is a challenge.

The speed of an AC motor is governed largely by the frequency of the applied alternating current. Speed control of AC motors thus depends on having an AC waveform with precisely controllable frequency. A practical solution for vehicles is to approximate the time-varying energy distribution of a sinusoidal AC waveform using one or more power pulse trains. The pulses are of constant amplitude, but vary in width as a function of the phase of the sinusoidal wave to be approximated. Although the pulses scarcely resemble sinusoidal waves, the current that flows in the motor windings is nearly sinusoidal because the inductance and back electromotive force of the motor windings filter out the high-frequency components of the power pulse train.

The required power pulse train can be generated by amplifying a drive pulse train that has the desired timing and pulse widths. Suitable DC powered power-pulse generation circuits are commercially available. A drive pulse train can be readily generated at logic power levels (e.g., +5 Volts) by reading out pulse-width values sequentially from a previously generated look-up table. In theory, such a table could be read out at different rates to provide for different frequencies. However, the power delivered would fall linearly with frequency, whereas vehicles tend to require more power at lower speeds. Furthermore, hardware with sufficiently precise variability, such as timers, is a cost concern.

An alternative approach would be to provide different tables for different frequencies. However, the storage requirements for a suitable number of tables would be burdensome. One widespread approach generates needed tables on the fly as follows. A digitized sine wave is read out at a selected rate; a digital-to-analog conversion provides an analog sine wave. This sine wave is then sampled at a constant frequency to provide a pulse-width look-up table. When this table is read out, a PWM pulse train is provided with the desired frequency. The problems with this approach include the costs of the timing and digital-to-analog sampling. In addition, there is an inevitable loss of precision in the conversions into and out of the analog domain.

All-digital PWM generation is desired to avoid analog processing. One approach uses an interpolator to modify pulse-width modulation values for a table corresponding to a given frequency to obtain values for a desired frequency. A disadvantage of this approach is the computational burden imposed by the interpolations, which also involve some loss of precision. This computation burden can adversely affect precision, responsiveness, and cost of an incorporating system. What is needed is an all-digital PWM generator that requires substantially less computational power than other PWM generators.

SUMMARY OF THE INVENTION

In accordance with the present invention, a waveform synthesizer comprises a look-up table, address generator means, address incrementer means, and pulse generator means. The look-up table stores pulse-width values and has serialized addresses corresponding to respective discrete phases of a periodic waveform. The address generator means is used to generate a series of address codes for accessing respective ones of the serialized addresses so as to retrieve the values stored in the look-up table. The address incrementer means then determines address increments between successive address codes in the series of address codes so that the address increments are at least in part a function of a requested frequency, and the address incrementer means has an input for receiving the requested frequency. The pulse generator means then generates a pulse train consisting of a series of pulses; the series of pulses has a corresponding series of pulse-widths that correspond to the pulse-width values addressed by the series of address codes.

In particular, the address increments generated by the address incrementer means are substantially proportional to the requested frequency. Furthermore, the address incrementer means varies the magnitude of the address increments over time to effect time-averaging frequency interpolation. More specifically, the address incrementer means varies the magnitude of the address increments over time by at most one for a given requested frequency.

Preferably, look-up table generator means is provided to generate the look-up table as a function of a requested current. The look-up table generator means has an input for receiving the requested current. The look-up table generator means further includes storage means for storing unscaled values for pulse widths as a function of the phase of the waveform for a given current; and scaling means for scaling the unscaled values as a function of the ratio of the amplitude of the requested current to the amplitude of the given current.

Alternatively, the waveform synthesizer in accordance with the present invention can be used in a single-phase motor drive system. Such a motor drive system comprises the waveform synthesizer to provide a first drive pulse train and a second drive pulse train that have a phase shift of 180°; a power source for supplying a DC power; and a power pulse generator that amplifies the first drive pulse train and the second drive pulse train so as to provide at least a first power pulse train and a second power pulse train that are alternatively applied to a motor, forming a periodic current waveform.

The motor drive system further comprises control means coupled to the address incrementer. The control means allows the address incrementer to receive the requested frequency so as to determine the address increments in response to the requested frequency. Also, the control means sends a requested current to the pulse-width value scaler by which the requested current is generated. In addition, the waveform synthesizer in accordance with the present invention can be used in a multi-phase motor drive system to smoothly drive a multi-phase motor with precise frequency adjustment and phase-shifts.

A method to synthesize a waveform comprises receiving a requested frequency; generating address increments as a function of the requested frequency; retrieving a series of pulse-width values from a look-up table at a series of addresses, the addresses of the series being spaced by the address increments; and generating a series of pulses having pulse-widths corresponding to the retrieved series of pulse-width values. Moreover, the step of generating address increments involves generating increments of varying magnitude to effect time-averaging frequency interpolation.

In summary, the present invention provides for generation of PWM pulse trains without digital-to-analog conversion. The frequency and amplitude of the pulse trains can be precisely adjusted. Furthermore, since values stored in the look-up table are from sampling only a half cycle of a periodic waveform, required storage space is small. Also, as the periodic waveform of a relative low frequency is sampled at a high rate, more sampled values characterizing waveforms of a wide frequency range are provided. To obtain a waveform of a requested frequency, address increments are varied so as to skip over addresses between successive retrieve operations and these values are linearly retrieved.

A typical application of the waveform synthesizer is for smooth motor drive with noise reduction and energy-saving. The motor drive system using the waveform synthesizer provides smooth motor drive without the Y-Δstart circuit, so the significant noise caused by the Y-Δstart circuit is eliminated. The speed change of the motor is done by gradually changing the address increment in the retrieve operation. Particularly, by generating a power pulse train of the step-up frequency, the slip caused by the low torque at the start stage of the motor can be minimized while a soft start is implemented. By adjusting frequency, a requested motor torque can be provided either in the starting stage of the motor drive or in the standard operation of the motor drive. Therefore, both energy-saving and motor derating are realized.

The power pulse trains provided by the waveform synthesizer and power waveform generator has precise frequency, phase, and current amplitude characteristics. Thus, users can get ride off an power supply of an unstable frequency from utility companies. In addition, the waveform synthesizer in accordance with the present invention can communicate with a network, so remote control of the motor is accomplished. These and other features and advantages of the present invention are apparent from the description below with reference to the following drawings.

DESCRIPTION OF THE PREFERRED EMBODIMENTS

Figure 1:
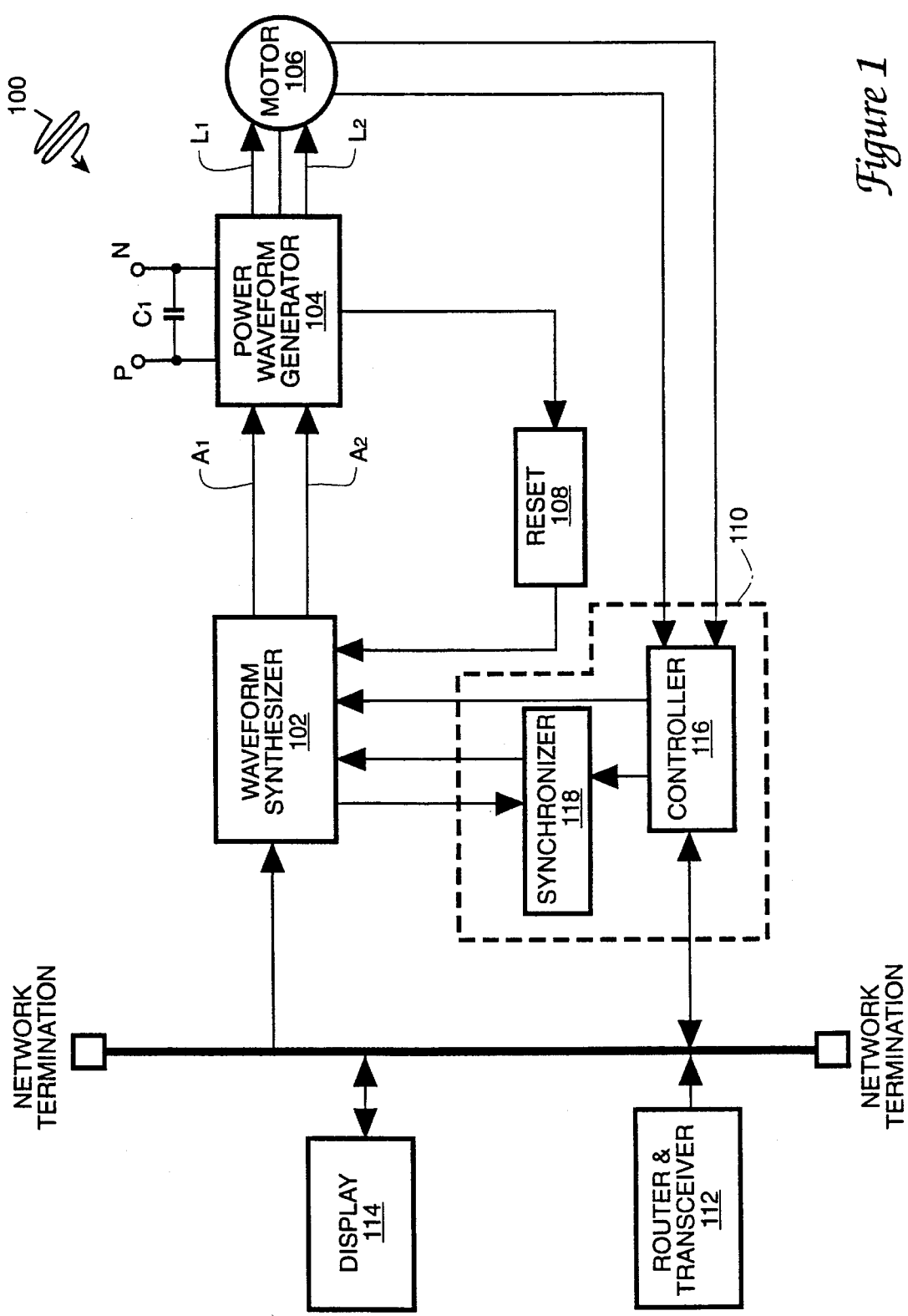
FIG. 1 is a block diagram of a single-phase motor drive system that uses the waveform synthesizer in accordance with the present invention.

In accordance with the present invention, a motor drive system 100 basically includes a waveform synthesizer 102, a power waveform generator 104, and a motor 106, as shown in FIG. 1.

The waveform synthesizer 102 is programmed to generate two PWM pulse trains with a phase shift of 180°. The PWM pulse trains are applied to the power waveform generator 104 via lines $A_1$ and $A_2$. A DC power source is applied to the power waveform generator 104 through terminals P and N across which a capacitor $C_1$ is connected to eliminate high frequency components. The drive pulse trains over lines $A_1$ and $A_2$ are alternatively amplified by the power waveform generator 104; thus, the power waveform generator 104 generates two power pulse trains directed to the motor 106.

In addition, a reset 108 is interposed between the power waveform generator 104 and the waveform synthesizer 102 to accept as inputs a detection signal from the power waveform generator 104 for shutting down the waveform synthesizer 102 when a fault of the power waveform generator 104 is detected. Furthermore, a sensor (not shown) in the motor 106 for monitoring the current amplitude of the power pulse trains sends a current detection signal to controller 116 of control section 110. In response to the current detection signal, the controller 116 provides a requested current to the waveform synthesizer 102. The waveform synthesizer 102, therefore, adjusts current amplitude of the PWM pulse trains, thereby keeping the current amplitude of the power pulse trains at a predetermined level.

Also, a quadrature sensor (not shown) attached to the motor 106 feeds a pair of signals of shaft's position to the controller 116. The position signals are used as a reference to stop the motor 106 at a predetermined shaft position. The control section 110 also includes a synchronizer 118 to enable the waveform synthesizer 102 to receive a network variable coming from a network (not shown) via the router/transceiver 112. When the network is ready to transmit a network variable to the waveform synthesizer 102, a flag signal is first applied to the controller 116 via the router/transceiver 112. The controller 116 responds to the flag signal to provide a control signal to the synchronizer 118. Responding to the control signal, the synchronizer 118 enables the waveform synthesizer 102 to receive the network variable via the router/transceiver 112.

The communication by router/transceiver 112 to the network can be conducted with available communication medium, for example, radio frequency transmission, electrical/optical connections, or wire transmission. The network variable includes parameters related to motor control such as frequency, current amplitude, and phase of the pulse trains. A display 114 is provided to display information such as frequency and current amplitude of the power pulse trains, and rotational directions of the motor 106.

Figure 2:
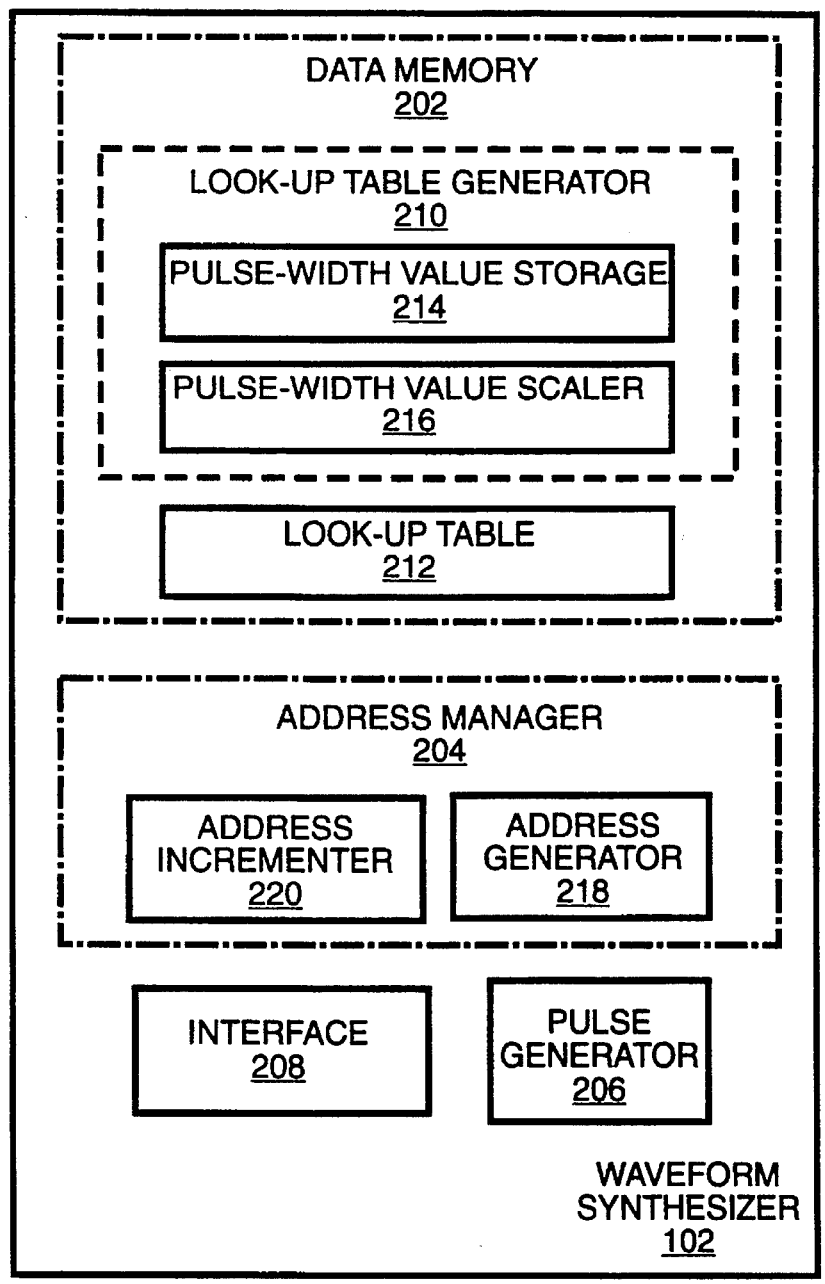
FIG. 2 is a function diagram of the waveform synthesizer in accordance with the present invention.

In particular, the waveform synthesizer 102 produces two sinusoidal PWM pulse trains with the same frequency but the phase shift of 180°. The waveform synthesizer 102 includes a data memory 202, an address manager 204, a pulse generator 206, and an interface 208, as shown in FIG. 2. The interface 208 manages the flow of information from a keyboard, a mouse, the router/transceiver 112, and synchronizer 118.

The data memory 202 includes a look-up table generator 210 and a look-up table 212. Further, the look-up table generator 210 includes a pulse-width value storage 214 and a pulse-width value scaler 216. The pulse-width value storage 214 is used to store pulse-width values obtained from sampling a low frequency sinusoidal signal at a relative high sampling rate. For example, pulse-width value storage 214 stores 625 sampled values of half cycle of a 2 Hz sinusoidal signal. Since the symmetry of the sinusoidal signal, these values can be periodically retrieved to generate a requested sinusoidal signal.

The look-up table generator 210 also generates a look-up table 212 on the basis of the sampled values by the pulse-width scaler 216 that functions as scaling current amplitude of the values stored in the pulse-width storage 214 as a function of the ratio of the amplitude of a requested current to the amplitude of the given current. For example, when the current amplitude is required to be augmented 200%, all values stored in the pulse-width storage 214 is scaled by the scaler 216 to 200% and these values are down loaded to the look-up table 212 so that the values in the look-up table 212 are values that have been augmented 200%. Therefore, pulse trains output from the pulse generator 206 has a current amplitude twice as the previous current amplitude. The look-up table 212 is assigned a series of addresses that correspond to the stored values. Preferably, the look-up table 212 is assigned 625 addresses corresponding to the 625 stored values. Since the 625 sampled values characterize a half cycle of the 2 Hz sinusoidal signal, the 625 addresses of the look-up table 212 correspond to respective discrete phases of the 2 Hz sinusoidal signal.

The address manager 204 then includes an address generator 218 that generates a series of address codes to access the addresses of the look-up table 212. In response to the address codes, the values in the look-up table 212 are accessed and read out. These values from the look-up table 212 are converted into PWM pulse trains by the pulse generator 206 within the waveform synthesizer 102.

To adjust the frequency of the PWM pulse trains from the pulse generator 206, an address incrementer 220 is provided within the address manager 204. The address incrementer 220 is used to determine address increments between successive address codes. Since the addresses of the look-up table 212 correspond to the respective discrete phases in a half cycle of a sinusoidal signal, adjusting the address increments changes the phases of the pulse trains within the half cycle. Moreover, since the phases of the periodic waveform are time-related, change of the address increments finally results in frequency change of the pulse trains. Therefore, the present invention implements frequency adjustment within a wide frequency range based on values that are obtained at a high sample rate to a sinusoidal signal of a low frequency. For example, the frequency range of the pulse trains generated by the waveform synthesizer 102 is up to 200 Hz by sampling 2 Hz sinusoidal waveform at 2.5 KHz sampling rate. The sampling rate relates to the frequency of the crystal in the waveform synthesizer 102. With the frequency of the crystal in the waveform synthesizer 102 changed, the sampling rate can be changed correspondingly.

Specifically, with the address accessing time given, for example, 0.4 ms (corresponding to the sampling rate), the address increments are directly proportional to the frequency of the pulse trains generated by the waveform synthesizer 102. When a pulse train of high modulation frequency is requested, the address increment becomes large to skip over more addresses of the look-up table 212 between successive retrieve operations. Since the timing between the retrieve operations is fixed as 0.4 ms, a short half cycle is generated with fewer values. Similarly, small address increments results in more values are retrieved, providing a pulse train of lower frequency.

The address incrementer 220 first determines the address increment in response to a requested frequency from the interface 208. On the basis of the address increment determined by the address incrementer 220, the address generator 218 generates address codes to retrieve the stored values from a beginning address at the address increment. Also, the address manager 204 compares the ending address of the look-up table 212 with a present address that is equal to the last address plus the address increment. When the present address exceeds the ending address, the address generator 218 calculates the difference of the last address and the ending address; further, the address generator 218 assigns this difference as the beginning address of the look-up table 212 in the successive retrieve operation cycle.

Particularly, this address generator 218 is useful for such a situation where stored values can only be retrieved at integer addresses. For example, when pulse trains of 60 Hz frequency are requested and the time interval between retrieve operations is 0.4 ms that is limited by the speed of the crystal clock, 20.75 pulses should be generated within each half-cycle of the 60 Hz pulse train by the address generator 218, where a half cycle of a periodic waveform of 60 Hz is 8.3 ms (t=1/60×1/2×8.3) and therefore, the number of retrieve operations needed to approximate the pulse train of 60 Hz frequency is 8.3/0.4=20.75. However, when the address generator 218 can only retrieve look-up table 212 at integer addresses such as 20 and 21 at an address increment of 30, the 20.75 th value cannot be provided because the last address within an identical retrieve operation cycle is at 600.

To solve this problem, the last address is deducted from the ending address and the difference is used as the beginning address of the next retrieve operation cycle. In this case, the difference between the ending address and the last address equals to 625 minus 600 and the result is 25, which is assigned to be the beginning address in the successive retrieve operation cycle. Thus, although 20 pulses that are shorter than the requested 20.75 pulses for the requested 60 Hz frequency are generated in the first retrieve cycle, the successive retrieve cycle provides 21 pulses that are one pulse more than 20 pulses in the previous retrieve cycle. Thus, a time-averaging 60 Hz frequency is generated. Therefore, a time-averaging frequency interpolation is effected by the address incrementer 220 that varies the magnitude of the increments over time. More specifically, the address incrementer 220 varies the magnitude of the increments over time by one for the given requested frequency.

Figure 4:
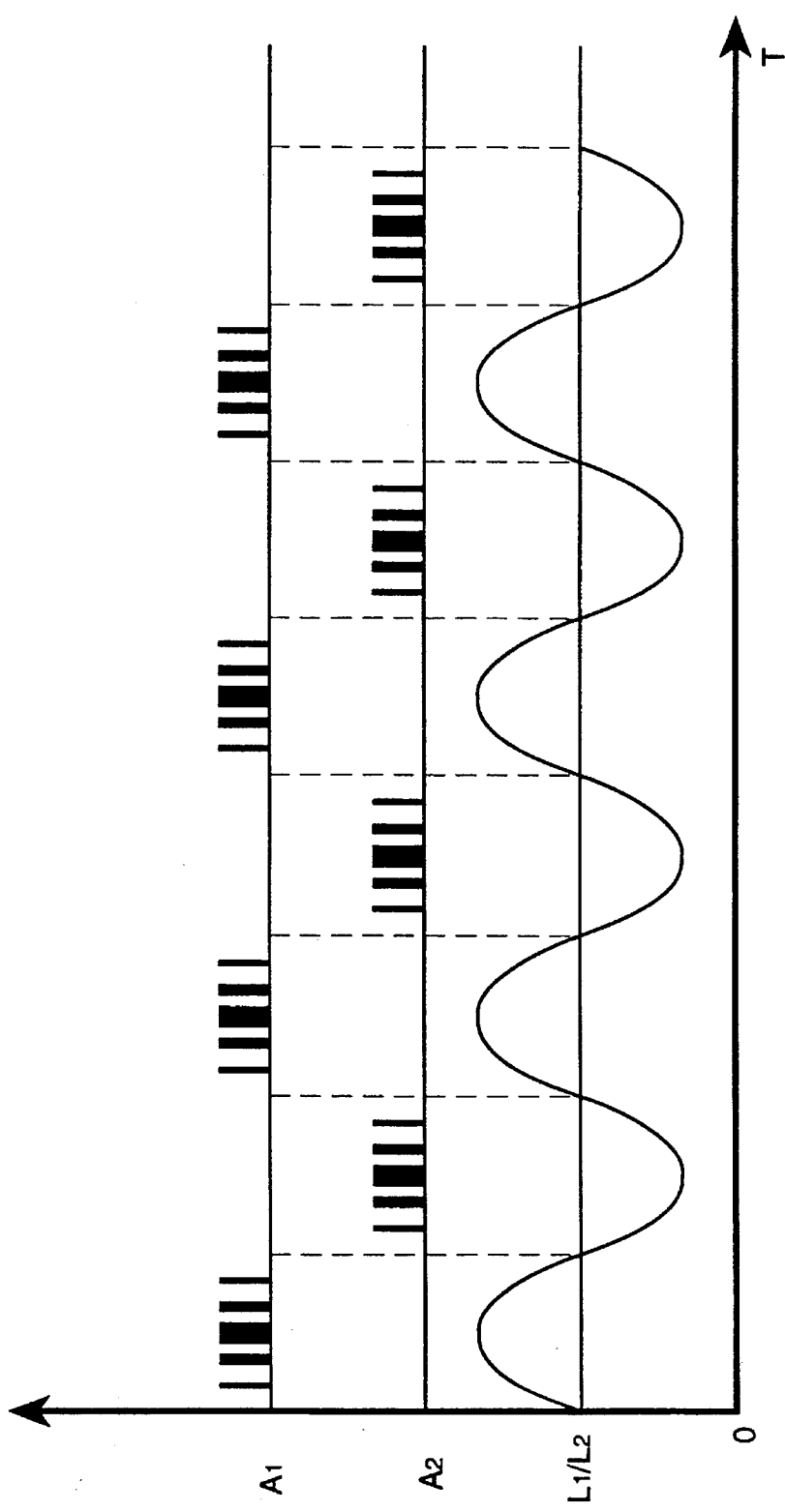
FIG. 4 shows waveforms of the single-phase motor drive system of FIG. 1.

In one preferred embodiment, the waveform synthesizer 102 and controller 116 are constituted with a microprocessor chip sold under the trademark Neuron®3120 ™ or Neuron®3150 ™, which is made by Echelon Corporation, 4015 Miranda Avenue, Palo Alto, Calif. 94304. The waveform synthesizer 102 can be programmed to produce the PWM pulse trains without need to sample a real analog sinusoidal waveform. The pulse trains generated from the waveform synthesizer 102 are shown in FIG. 4.

Figure 3:
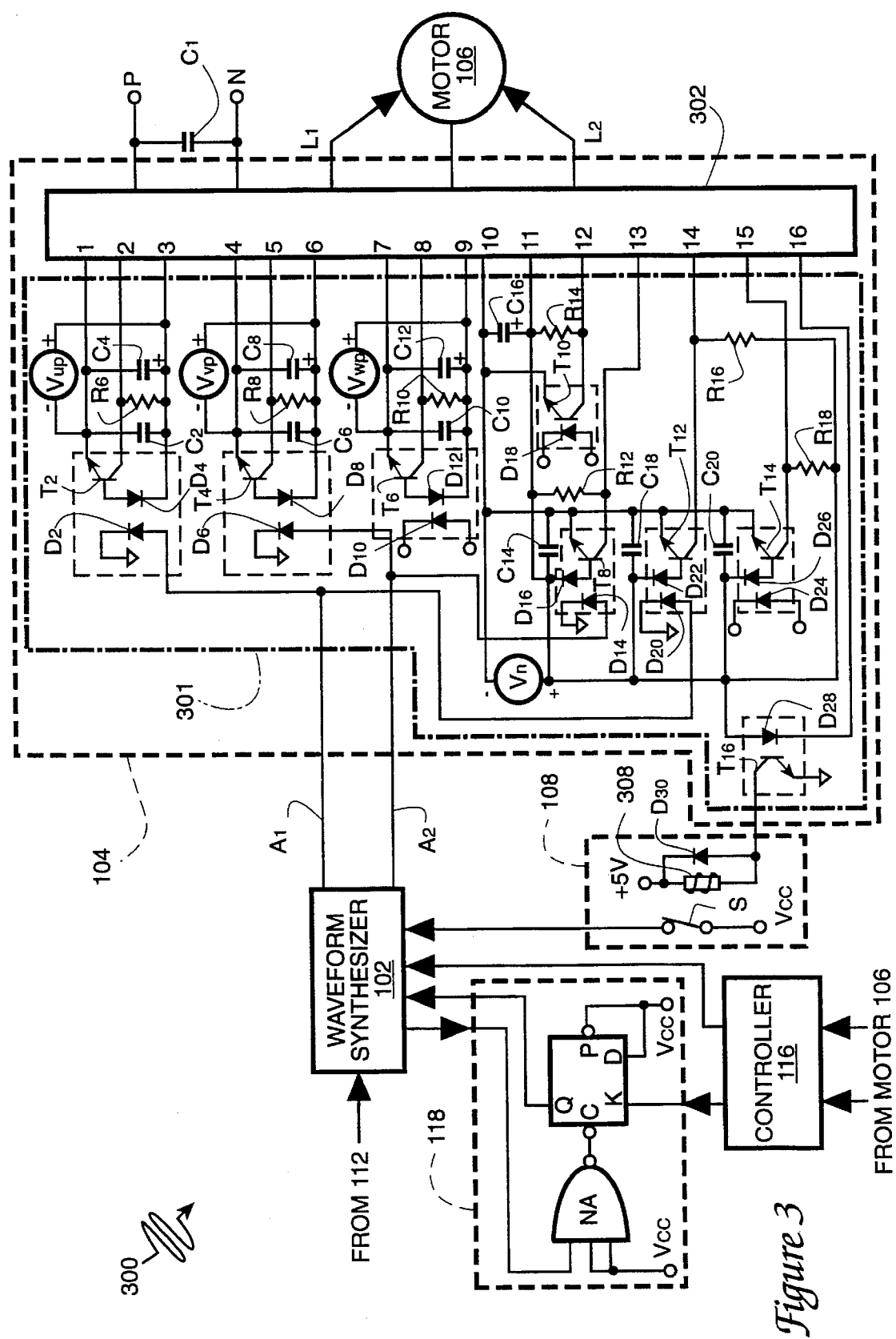
FIG. 3 is a circuit diagram of FIG. 1.

The pulse widths of each pulse over lines $A_1$ and $A_2$ correspond to the current amplitudes, so the sinusoidal current waveform can be generated by modulation of the pulse width. Since the PWM pulse trains over lines $A_1$ and $A_2$ are provided by linear retrieve of the look-up table 212, the drive pulse trains are a pair of pulse trains of the same current amplitude and frequency but 180° phase shift. The pulse trains from the waveform synthesizer 102 are typically applied to drive a power inverter module that drives a AC motor, detailed as shown in FIG. 3.

The drive pulse trains from waveform synthesizer 102 are applied to the power waveform generator 104 over lines $A_1$ and $A_2$. In the preferred embodiment of the present invention, the power waveform generator 104 is implemented by an IGBT module. Available IGBT modules include products made by Powerex, Inc., Hillis Street, Youngwood, Pa. 15697. A voltage couple circuit 301 is provided to isolate the low voltage motor control section from the IGBT transistor module operated at the high motor voltage. In the IGBT module 302, six IGBT transistors are connected to constitute three pull-push amplifiers in parallel. The DC power source is applied to the three pull-push amplifiers through the P and N terminals. The gates of a pair of IGBT transistors constituting a pull-push amplifier are driven by two drive pulse trains from lines $A_1$ and $A_2$ so that each IGBT transistor of the pull-push amplifier is alternatively enabled, thereby providing a power pulse train at the output of the pull-push amplifier.

To drive a single-phase AC motor, each of the two drive pulse trains over lines $A_1$ and $A_2$ is applied to the gates of two complementary IGBT transistors in two respective pull-push amplifiers, and the outputs of the two respective pull-push amplifiers are provided over lines $L_1$ and $L_2$ to drive the single-phase motor.

More specifically, the drive pulse train from line $A_1$ is applied to a diode-transistor coupler formed by diodes $D_2$, $D_4$, and transistor $T_2$. During the drive pulses are at high level, the optical couple diode $D_2$ is conductive. Since a positive voltage from $V_{up}$ is applied to the collector of $T_2$ via resistor $R_6$(20KΩ) and the emitter of $T_2$ is coupled to the negative end of the DC source $V_{up}$, the conductive state of diodes $D_2$ causes the gate of $T_2$ at high bias so that the transistor $T_2$ becomes conductive. Diode $D_4$ is designed to isolate the positive voltage at the gate of $T_2$ from $V_{up}$. Capacitor $C_2$(0.1 μF) functions as a frequency filter and capacitor $C_4$(10 μF) isolates direct current components. Thus, the drive pulse train over line $A_1$ is coupled to the inputs 2 and 3 of the IGBT module 302.

Furthermore, the pulse train over line $A_1$ is also applied to a diode-transistor coupler formed by diodes $D_{20}$, $D_{22}$, and transistor $T_{12}$. A positive voltage of a DC source $V_n$ is applied to the collector of $T_{12}$ via a resistor $R_{16}$ (20 KΩ), and the ground end of the DC source $V_n$ is connected to the emitter of $T_{12}$. Capacitor $C_{18}$(0.1 μF) functions as a frequency filter and capacitor $C_{16}$(33 μF) isolates direct current components of DC source $V_n$. Similar to the coupling above mentioned, the drive pulse train over line $A_1$ is also applied to the input 14 of the IGBT module 302. Further, a DC voltage is applied to the inputs P and N of the IGBT module 302. The DC voltage is preferably ranged from 300V to 600V, which can be obtained by rectifying an AC power source. Capacitor $C_1$ is interposed between P and N inputs for filtering AC frequency components.

In response to the drive pulse train from line $A_1$ that is applied at inputs 2, 3, and 14, the IGBT module 302 amplifies the DC voltage to provide a power pulse train on $L_1$. On the other hand, the pulse train from line $A_2$ is applied at the inputs 5, 6, and 13 of the IGBT module 302 is amplified to produce pulse train $L_2$ in the other half-wave cycle. Since pulse trains in the two half-wave cycles have a phase shift of 180°, the outputs on the lines $L_1$ and $L_2$ are two pulse trains with 180° phase shift. The power pulse trains are applied to the motor's inductive coils so as to generate a sinusoidal waveform as shown in FIG. 4.

Since the power pulse trains are determined by programming the waveform synthesizer 102, a pulse train of predetermined frequency, current amplitude, and phase characteristics can be precisely yielded as requested. Therefore, the motor drive system in accordance with the present invention is typically suitable to be used in those areas where precise control of the frequency and current amplitude are required.

To prevent the IGBT module 302 from damage caused by faults such as overheating, an optical coupler of a transistor $T_{16}$ and a diode $D_{28}$ is provided. The anode of $D_{28}$ is connected to the positive voltage of $V_n$ and the cathode of $D_{28}$ is connected to pin 16 of IGBT module 302. When a fault is detected by the IGBT module 302, the pine 16 is pulled down, activating the diode $D_{28}$ and the transistor $T_{16}$ whose collector is tied to a +5V voltage via an inductance coil 308 that forms the reset circuit 108 along with a diode $D_{30}$ and a switch S. The switch S is at a constant close position when transistor $T_{16}$ is off. However, the conduction of the transistor $T_{16}$ activates switch S to open, cutting off the $V_{cc}$ voltage applied to the reset pin of the waveform synthesizer 102. Thus, the waveform synthesizer 102 is reset in response to a fault detection signal from the IGBT module 302. The waveform synthesizer 102 is remained reset until the output from pin 16 of the IGBT module 302 returns to high, which results in the diode $D_{28}$ off, in turn, transistor $T_{16}$ off, so switch S returns to its close position and the waveform synthesizer 102 resumes operation.

Synchronizer 118 is composed of a NAND gate NA and a D flip-flop, connected as shown in FIG. 3. The waveform synthesizer 102 has its state change pin (I/O 7 of Neuron®3120 ™ chip or Neuron®3150 ™ chip) coupled to one input of gate NA with whose two other inputs pulled high. If no update occurs in waveform synthesizer 102, the output at the state change pin remains at low, allowing the D flip-flop to be triggered by the controller 116.

When the router/transceiver 112 sends a flag signal informing the controller 116 of that a network variable is ready to be transmitted to the waveform synthesizer 102, the high level at the output of the gate NA allows the control signal from the controller 116 to trigger the clock end K of D flip-flop, setting the Q output of D flip-flop at high. This high level is applied to the waveform synthesizer 102, in particular, the I/O 8 of Neuron®3120 ™ chip or Neuron®3150 ™ chip, activating the waveform synthesizer 102 to receive the network variable from the network via the router/transceiver 112 and network termination.

After received the network variable, the waveform synthesizer 102 produces a high level at its state change output, i.e., the I/O 7 of Neuron®3120 ™ chip or Neuron®3150 ™ chip becomes high. This high level is applied to the input of gate NA to turn its output to a low level. This low level at the output of gate NA is further applied to the clear end C of the D flip-flop, resetting the high level at the Q output of D flip-flop to low, which further sets the state change output of the waveform synthesizer 102 to low. Thus, the D flip-flop becomes ready to enable the waveform synthesizer 102 when the next network variable comes.

Figure 5:
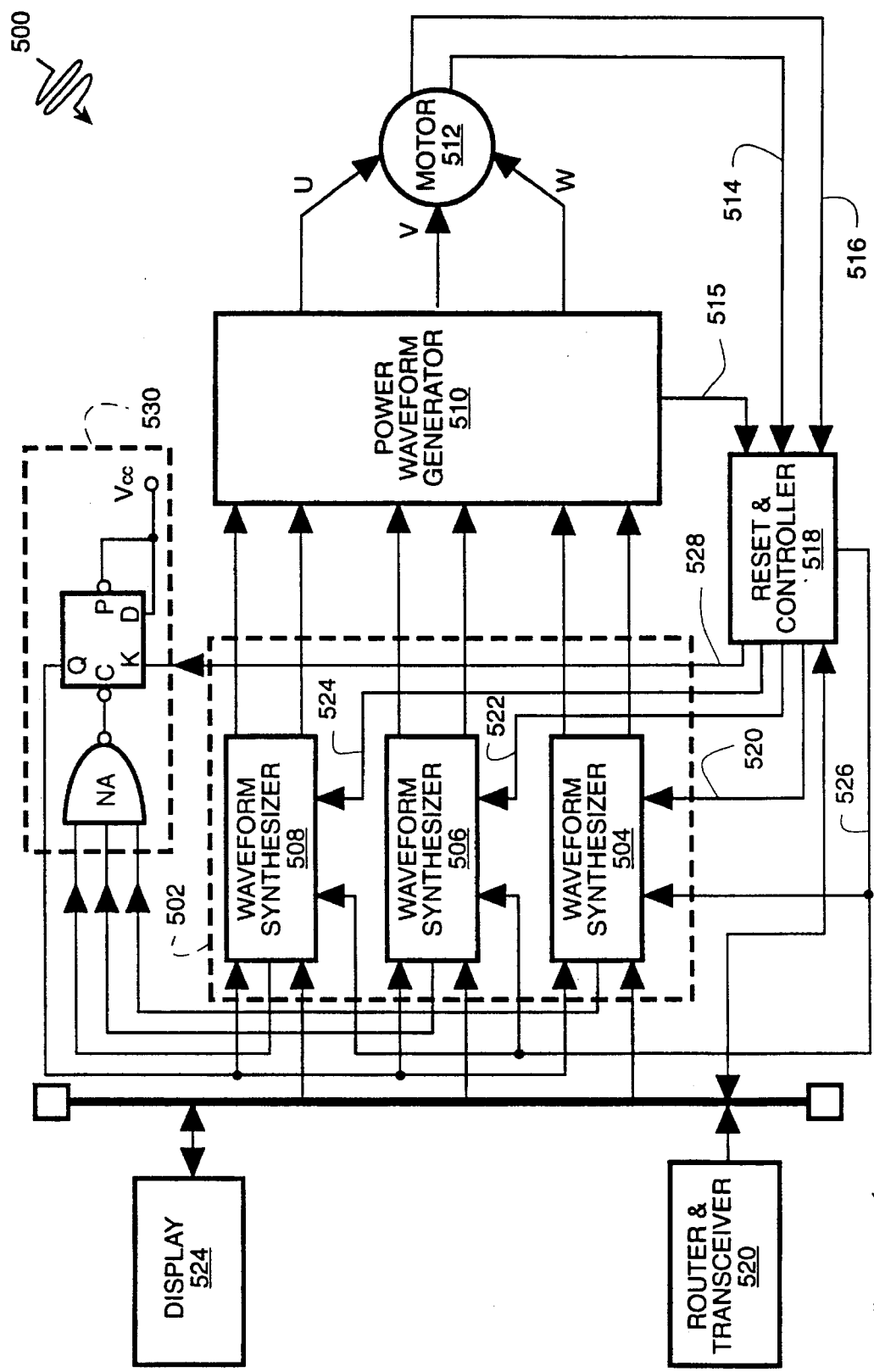
FIG. 5 is a block diagram of a three-phase AC motor drive system that uses the waveform synthesizers in accordance with the present invention.

The motor drive system shown in FIG. 3 may be modified to drive a three-phase AC motor, as shown in FIG. 5. The motor drive system 500 for driving a three-phase AC motor includes a drive pulse train generator 502 including three waveform synthesizers 504, 506, and 508. These waveform synthesizers 504, 506, and 508 are programmed to generate three pairs of pulse trains; each pair of drive pulse trains has 120° phase shift out of each other.

The three pairs of drive pulse trains are then fed to the power waveform generator 510 that may be implemented with the voltage couple circuit and the IGBT module shown in FIG. 3. In this embodiment, the drive pulse trains from the waveform synthesizer 504 are respectively coupled to the diodes $D_2$ and $D_{14}$ of the voltage couple circuit, the drive pulse trains from the waveform synthesizer 506 are respectively coupled to the diodes $D_6$ and $D_{20}$ of the voltage couple circuit, and the drive pulse trains from the waveform synthesizer 508 are respectively coupled to the diodes $D_{10}$ and $D_{24}$ of the voltage couple circuit. Thus, the IGBT module provides three PWM power pulse trains at outputs U, V, and W. The three power pulse trains have a phase shift of 120° with respect to each other, as programmed in each waveform synthesizer.

Likewise, a reset/controller 518 is provided. The reset/controller 518 responds to the current detection signals at bus 514 generated by sensors (not shown) in the three-phase AC motor to provide signals via buses 520, 522, and 524 to the waveform synthesizers 504, 506, and 508 respectively for close loop control on current amplitudes of pulse trains. Also, a fault detect signal from the power waveform generator 510 is fed to the reset/controller 518 by line 515.

The reset/controller 518 provides signals to the waveform synthesizers 504, 506, and 508 via buses 520, 522, and 524 in response to the fault detect signal from the line 515, thereby resetting the waveform synthesizers 504, 506, and 508 when a fault occurs until the fault is eliminated. Other outputs applied to the controller 518 by bus 516 from motor 512 include quadrature signals indicating the shaft of the motor at a requested position. On the basis of the quadrature signals, reset/controller 518 sends signals via buses 520, 522, and 524 to the waveform synthesizers 504, 506, and 508, so that the motor 512 can be controlled to stop at any required shaft position.

To keep a precise phase shift of 120° among the three power pulse trains applied to the three-phase motor 512, reset/controller 518 also provides a phase shift hold signal forwarding to the waveform synthesizers 504, 506, and 508 via line 526. The phase shift hold signal over line 526 forces the phase shift among the power pulse trains at 120°. More specifically, the phase shift hold signal is provided at the I/O 1 of Neuron®3120 ™ chip or Neuron®3150 ™ chip that constitutes the reset/controller 518, and the phase shift hold signal over line 526 is respectively applied to the I/O 1 ends of Neuron®3120 ™ chips or Neuron®3150 ™ chips that constitute the waveform synthesizers 504, 506, and 508.

In addition, synchronizer 530 similar to synchronizer 118 of FIG. 3 is provided for the waveform synthesizers 504, 506, and 508 to receive a network variable in synchronization. As shown in FIG. 5, each of the waveform synthesizers 504, 506, and 508 has its state change output coupled to the input of the gate NA. The state change outputs remain at low level while no network variable update occurs, keeping output of NA gate at high. When the router/transceiver 520 sends a flag signal informing the reset/controller 518 of that a network variable is ready to be transmitted to the waveform synthesizers, the high level at the output of the gate NA allows the control signal over line 528 from the reset/controller 518 to trigger the clock end K of D flip-flop, setting the Q output of D flip-flop at high. This high level is then applied to the waveform synthesizers 504, 506, and 508 (the I/O 8s of Neuron®3120 ™ chips or Neuron®3150 ™ chips), allowing them to receive network variables from the network via the router/transceiver 520 and the termination.

After received the network variable, each waveform synthesizer produces a high level at its state change output. However, since the three waveform synthesizers 504, 506, and 508 are programmed to produce three pulse trains of 120° phase shift, network variables are received by the three waveform synthesizers 504, 506, and 508 with 120° phase shift. Therefore, the waveform synthesizers 504, 506, and 508 are programmed so that the high levels at the state change outputs of the three waveform synthesizers 504, 506, and 508 are overlapped to set the output of gate NA to low. This low level is applied to the clear pin C of the D flip-flop, resetting the D flip-flop, which, in turn, sets state change outputs of the waveform synthesizers 504, 506, and 508 to low. Thus, the output of the gate NA is set to high by the state change outputs of the waveform synthesizers 504, 506, and 508 so that the D flip-flop becomes ready to enable the waveform synthesizers 504, 506, and 508.

Furthermore, a multiple phase motor drive system can be implemented by modifying the above-mentioned motor drive system in a similar manner. Therefore, it is simple to provide a motor drive system with precise local and remote frequency and current amplitude control for single-phase motors, three-phase motors, or multiple phase motors. The network termination may carry as many waveform synthesizers as it allows. In one embodiment, the network termination can carry 64 waveform synthesizers. With the control of the reset/controller 518, all of these waveform synthesizers can be synchronized in receipt of network variables.

Figure 6:
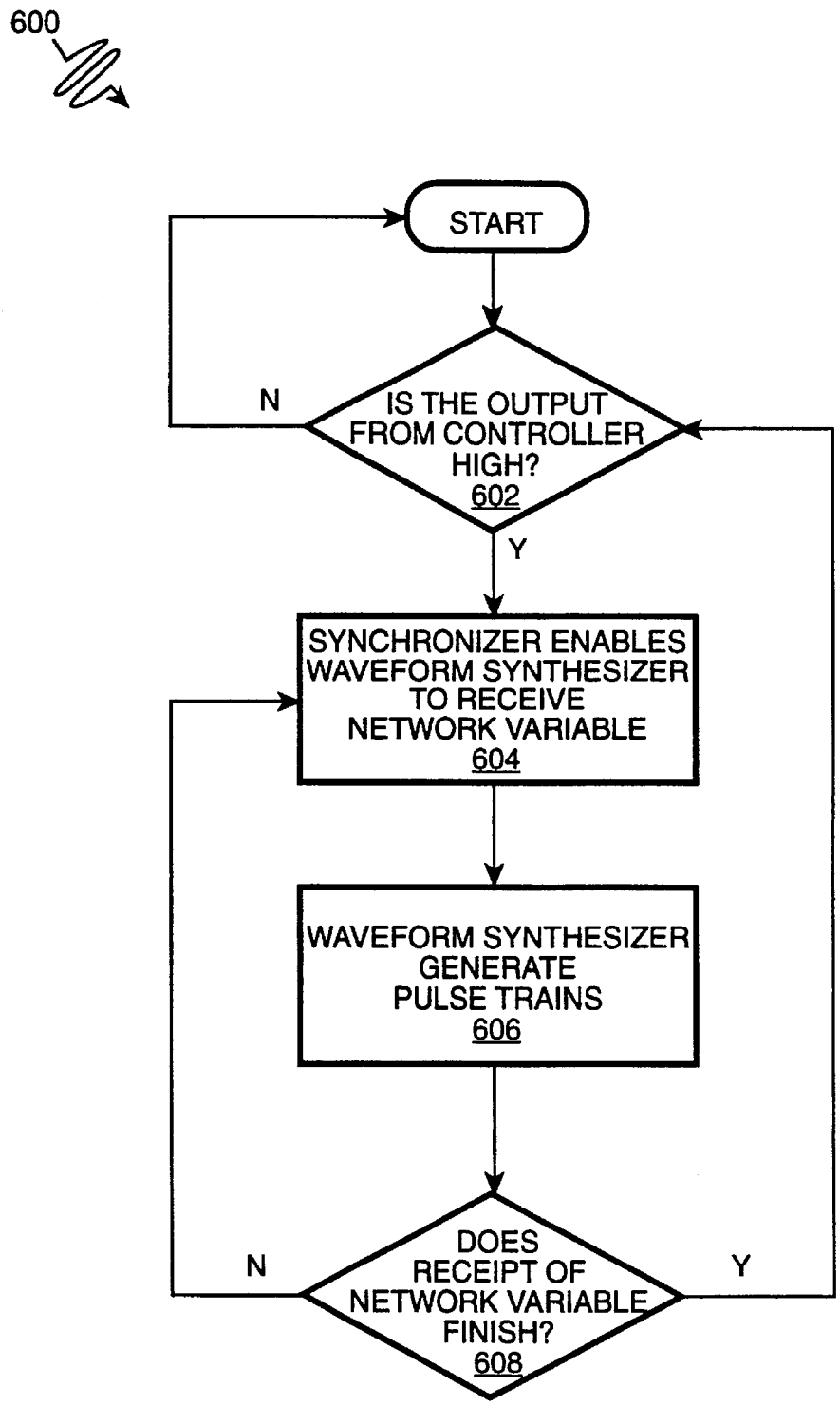
FIG. 6 is a flow chart showing the procedure that the motor drive system communicates with a network.

FIG. 6 is a flow chart showing the communication between the waveform synthesizer 102 and a network. The procedure begins at step 602 where the output state of controller 116 of FIG. 1 is determined. If the output of the controller 116 to the synchronizer 118, as shown in FIG. 1, is at low, waveform synthesizer 102 remains disable. When the controller 116 has a high output, synchronizer 118 enables waveform synthesizer 102 through its interface 208 to receive the network variable at step 604; this network variable is further read into the address incrementer 220 with which address generator 218 directs pulse generator 206 to output a PWM pulse train at step 606. Decision block 608 detects whether receipt of the network variable finishes. If not, the program repeats to execute steps 604–608 until the network variable is completely received by the waveform synthesizer 102. Then, controller 116 and waveform synthesizer 102 resume to execute operation instructed by the program and the procedure goes back to step 602, detecting incoming network variable.

Figure 7:
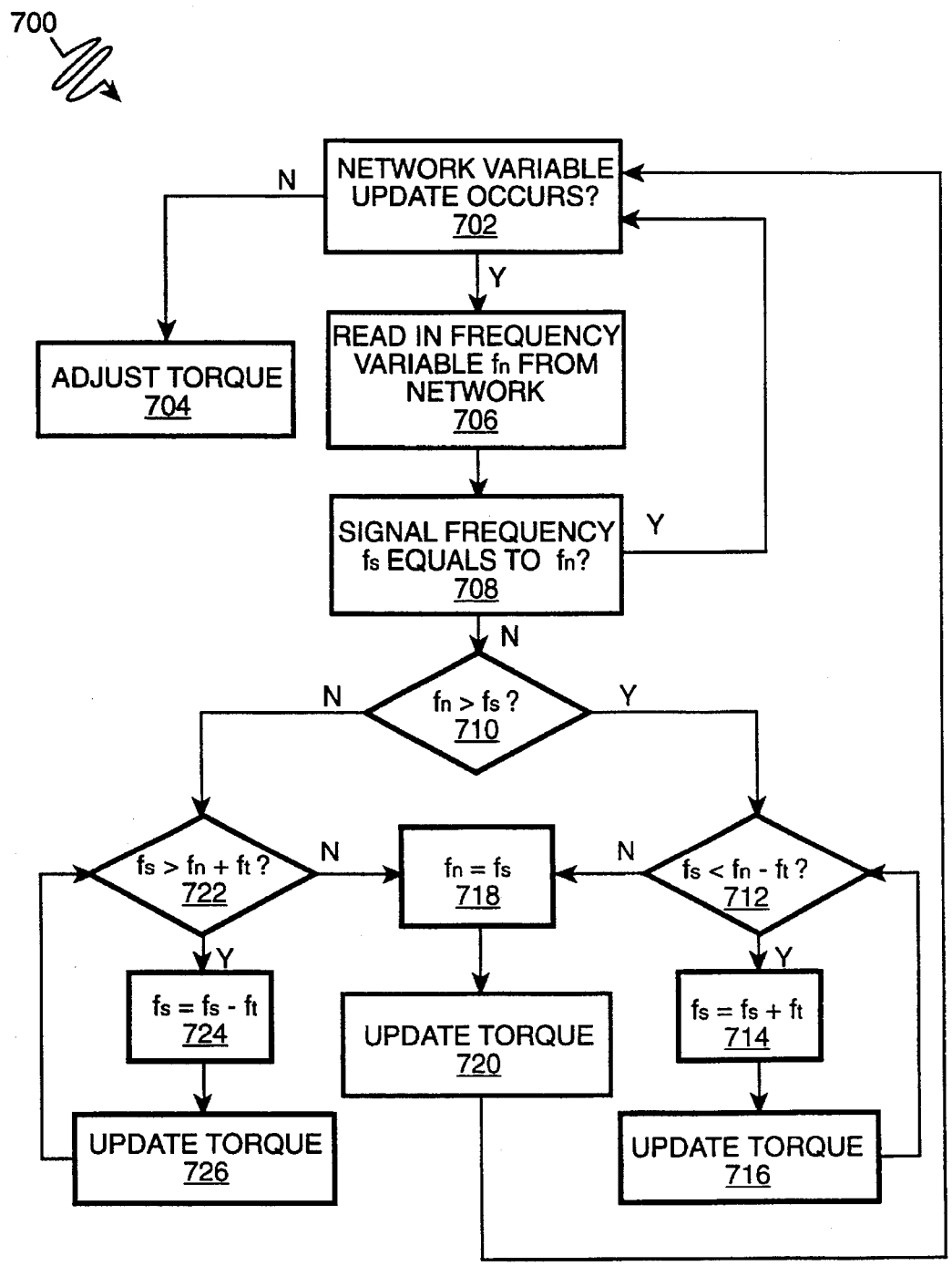
FIG. 7 is a flow chart showing adjustment of the frequency of the power waveform as well as the motor torque.

To provide a smooth motor drive in response to a frequency variable from the network via router/transceiver requesting frequency update, a flow chart shown in FIG. 7 is programmed. This program begins at step 702 where the motor drive system in accordance with the present invention detects whether a network variable update occurs. When no network variable update occurs, the motor drive system keeps tracking the current amplitude of the power pulse trains applied to the motor and dynamically adjusts the motor torque through the controller 116 and the pulse-width value scaler 216 upon application, at step 704. If the network variable update occurs, controller 116 and synchronizer 118 acts to allow the waveform synthesizer 102 to read in a frequency variable $f_n$ from the network through the interface 208 at step 706.

The controller 116 further compares the frequency $f_s$ of the existing pulse trains with the set-up frequency $f_n$ at step 708. If $f_n = f_s$, the process returns to step 702 and the waveform synthesizer 102 does not change the frequency $f_s$. If $f_n \neq f_s$, the process forwards to step 710 where whether $f_n$ is larger than $f_s$ is checked. If $f_n$ is larger than $f_s$, which means that the frequency $f_s$ should be gradually ramped up, the process goes to step 712 where a comparison of $f_s < f_n - f_t$ is conducted, wherein, $f_t$ is a predetermined frequency increment, i.e., the ramp rate. The purpose setting such a frequency increment is to ramp the frequency $f_s$ up to the requested frequency $f_n$ gradually so as to avoid the noise, slip, and unstable speed of the motor due to abrupt frequency change.

When decision step 712 detects that frequency $f_s$ is smaller than the difference of the requested frequency $f_n$ and the predetermined frequency increment $f_t$, the frequency $f_s$ is increased by the predetermined frequency increment $f_t$ at step 714. Along with the increase of the frequency, the motor drive system in accordance with the present invention monitors the current amplitude of the power pulse trains applied to the motor. In response to the current detection, the controller 116 can update input current, i.e., the motor torque to optimize the efficiency of motor operation for various applications. As a result, the smooth motor driving and energy-saving are implemented.

These steps 712–716 are reiterated until the frequency $f_s$ is no longer smaller than the difference of the requested frequency $f_n$ and the predetermined frequency increment $f_t$. Then the process goes to step 718 where the frequency $f_s$ is updated to the requested frequency $f_n$. Also, the motor drive system in accordance with the present invention monitors the current applied to the motor and the current detection signal is fed back to the controller 116 by which the waveform synthesizer 102 is controlled to provide an appropriate current to update the motor torque at step 720. Meanwhile, the processing goes back to step 702 where the motor drive circuitry keeps watching whether a new network variable update request occurs.

On the other hand, when the network frequency variable $f_n$ is smaller than frequency $f_s$, which means that the frequency $f_s$ should be gradually ramped down, the process then goes to step 722 from step 710 where a comparison of $f_s > f_n + f_t$ is conducted. When decision step 722 detects that frequency $f_s$ is larger than the sum of the requested frequency $f_n$ and the predetermined frequency increment $f_t$, the frequency $f_s$ is subtracted by the predetermined frequency increment $f_t$ at step 724.

Along with the subtraction of the frequency, the motor drive system monitors the current applied to the motor. In response to the current detection signal applied to the controller 116 from the motor, the waveform synthesizer 102 provides an appropriate current level to update the motor torque at step 726 to implement the smooth motor driving and energy-saving. This process is reiterated until the frequency $f_s$ is no longer larger than the sum of the requested frequency $f_n$ and the predetermined frequency increment $f_t$. Then the process goes to step 718 and the rest of process is the same as mentioned above.

Although the frequency variable is taken as an example, the network variables can be any parameters related to motor control or motor drive. Also, the function of the waveform synthesizer can be implemented by programming a microprocessor. Further, the waveform synthesizer can also be programmed to provide a pulse train and a control signal so that the pulse train is splitted by a splitter into two pulse trains that have the same frequency but 180° phase shift. These and other modifications to and variations upon the preferred embodiments are provided for by the present invention, the scope of which is limited only by the following claims.

What is claimed is:

1. A waveform synthesizer comprising:

a look-up table for storing pulse-width values, said look-up table having serialized addresses, said addresses corresponding to respective discrete phases of a periodic waveform;

address generator means for generating a series of address codes for selectively accessing said serialized addresses;

address incrementer means for determining an address increment between successive address codes in said series of address codes in response to a requested frequency, said address increments being at least in part a function of said requested frequency so that said address generator means generates said series of address codes at the determined address increment for selectively accessing said serialized addresses, said address incrementer means having an input for receiving said requested frequency;

look-up table generator means, said look-up table generator means generating said look-up table as a function of a requested current, said look-up table generator means having an input for receiving said requested current; said look-up table generator means including:

storage means for storing unscaled values for pulse-widths as a function of the phase of said waveform for a given current, and scaling means for scaling said unscaled values as a function of the ratio of the amplitude of said requested current to the amplitude of said given current; and pulse generator means for generating at least one pulse train, said pulse train consisting of a series of pulses, said series of pulses having a corresponding series of pulse-widths, said series of pulse-widths corresponding to the pulse-width values addressed by said series of address codes.

2. A waveform synthesizer as recited in claim 1 wherein said address increments are positively proportional to said requested frequency.

3. A waveform synthesizer as recited in claim 1 wherein said address incrementer means varies the magnitude of said increments over time to effect time-averaging frequency interpolation.

4. A waveform synthesizer as recited in claim 3 wherein said address incrementer means varies the magnitude of said increments over time by at most one for a given requested frequency.

* * * * *